L. CLIPPINGER.
COOP SUPPORT.
APPLICATION FILED MAR. 14, 1916.
1,211,546.
Patented Jan. 9, 1917.
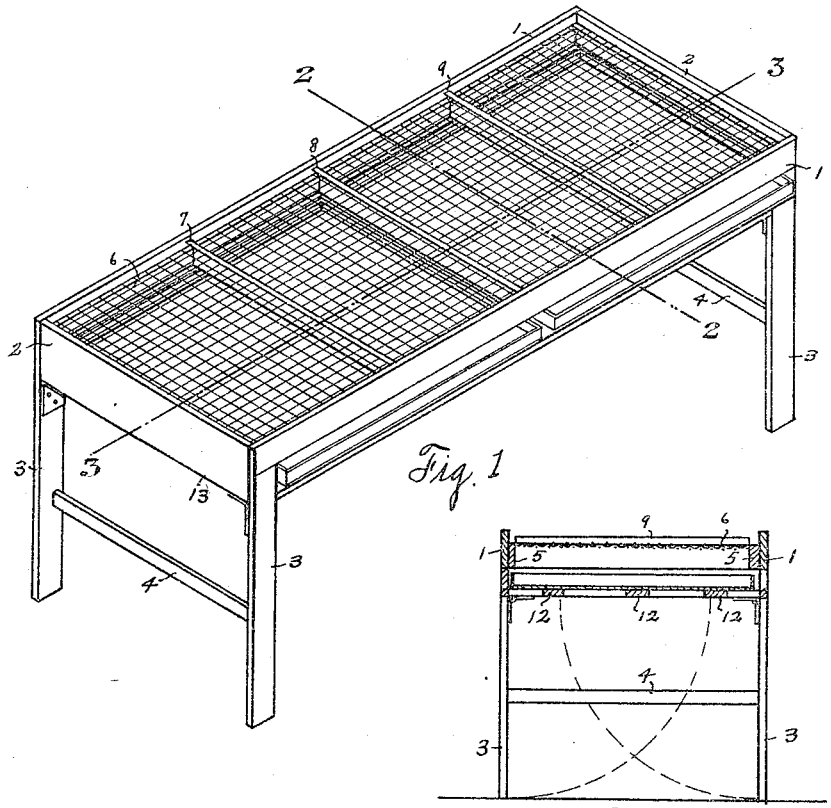
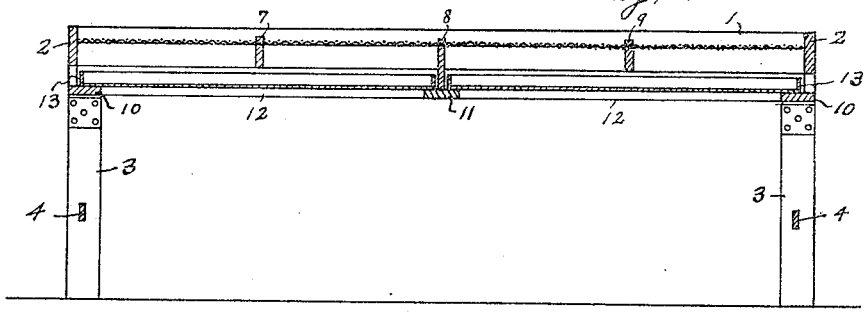
INVENTOR
Levi Clippinger
BY
Hardway Cathy
ATTORNEYS

UNITED STATES PATENT OFFICE.

LEVI CLIPPINGER, OF LLANO, TEXAS.

COOP-SUPPORT.

1,211,546.    Specification of Letters Patent.    Patented Jan. 9, 1917.

Application filed March 14, 1916. Serial No. 84,059.

*To all whom it may concern:*

Be it known that I, LEVI CLIPPINGER, a citizen of the United States, residing at Llano, in the county of Llano and State of Texas, have invented certain new and useful Improvements in Coop-Supports, of which the following is a specification.

This invention relates to new and useful improvements in a coop support.

The object of the invention is to provide a device of the character described designed for the purpose of supporting poultry and other similar coops, and will be used chiefly for exhibition purposes at poultry shows.

Exhibition coops as commonly made are without bottoms and rest upon tables or boards, or the like in the show rooms and consequently soon accumulate refuse and waste and become unsanitary. This support is provided with a wire netting suitably braced and forming the bottom of the coop placed thereon and is also equipped with a removable refuse pan by means of which the accumulated refuse may be readily removed.

With the above and other objects in view the invention has particular relation to certain novel features of construction, arrangement of parts and use, an example of which is given in this specification and illustrated in the accompanying drawings, wherein:—

Figure 1 is a perspective view of the device, Fig. 2 is a transverse sectional view taken on the line 2—2 of Fig. 1, and Fig. 3 is a longitudinal sectional view taken on the line 3—3 of Fig. 1.

Referring now more particularly to the drawings wherein like numerals of reference designate similar parts in each of the figures a rectangular framework has been provided formed of the side members 1, 1 and the end members 2, 2, which are suitably secured together, the framework being supported by the legs 3, which are hinged to the respective corners thereof so as to be folded inwardly for convenience in shipping and the legs at the respective ends of the device are secured against folding inwardly, when the device is in use, by means of the removable cross braces 4, 4. Secured to the inner sides of the respective side members 1, 1 are the lengthwise ribs 5, 5, provided to support the coop, which fits within the side members 1, 1 and rests upon said ribs and wire netting 6 is secured to the side and end members 1 and 2 of the framework forming a bottom for the coop supported by said framework and this wire netting is reinforced by the transverse braces 7, 8 and 9 arranged upon top of the wire netting and forming roost poles for the fowls. Spaced below the end members 2, 2 and secured to the side members 1, 1 of the framework, are the transverse end bars 10, 10 and the central bar 11 and secured to the respective end bars 10 at one end and the central bar 11 at the other, are the lengthwise braces 12, 12, 12 spaced apart and forming a support for the refuse pans 13, 13 which may be slid into and out of position underneath the wire netting floor 6, these pans being supported, when in position, by means of the central bar 11 at one side and the respective end bars 10 at the other. These pans receive the refuse and waste matter falling through the floor 6 and may be readily removed and emptied, and the coop thus kept in a sanitary condition.

What I claim is:—

1. A coop support including a rectangular framework composed of side and end members secured together, legs hinged to the respective corners thereof and adapted to be folded inwardly, lengthwise ribs secured to the inner sides of the side members and adapted to support the coop, said side and end members extending up above the ribs to receive the coop which rests upon said ribs and to secure said coop upon the support. Wire netting secured to the side and end members and forming a bottom for the coops supported by said framework and transverse braces spaced apart secured at their respective ends to the corresponding side members reinforcing the wire netting and forming roost poles for the fowls.

2. A coop support including a rectangular framework composed of side and end members secured together, legs hinged to the respective corners thereof and adapted to be folded inwardly, lengthwise ribs secured to the inner sides of the side members and adapted to support the coop, said side and end members extending up above the ribs to receive the coop which rests upon said ribs and to secure said coop upon the support, wire netting secured to the side and end members and forming a bottom for the coops supported by said framework, transverse braces spaced apart secured at their respective ends to the corresponding side members reinforcing the wire netting and forming roost poles for the fowls, transverse end bars spaced below the end members and secured to the side members and a central bar secured to the side members underneath, lengthwise braces spaced apart secured at one end to the respective end bars and at their other ends to the central bar and forming a support and removable refuse pans, one arranged on each side of the central bar upon said support and adapted to receive the refuse falling through the wire netting.

In testimony whereof I have signed my name to this specification in the presence of two subscribing witnesses.

LEVI CLIPPINGER.

Witnesses:
ELI PARKHILL,
W. B. HAYNIE.